(12) United States Patent
Rajala (10) Patent No.: US 9,401,082 B2
(45) Date of Patent: Jul. 26, 2016

(54) OFFENDER MONITOR WITH ORIENTATION-BASED MONITORING

(71) Applicant: Numerex Corp., Atlanta, GA (US)

(72) Inventor: Yoganand Rajala, Alpharetta, GA (US)

(73) Assignee: Numerex Corp., Atlanta, GA (US)

( * ) Notice: Subject to any disclaimer, the term of this patent is extended or adjusted under 35 U.S.C. 154(b) by 59 days.

(21) Appl. No.: 14/525,786

(22) Filed: Oct. 28, 2014

(65) Prior Publication Data

US 2016/0117909 A1    Apr. 28, 2016

(51) Int. Cl.
*G08B 23/00* (2006.01)
*G08B 21/22* (2006.01)
*G06F 3/01* (2006.01)
*G06F 1/16* (2006.01)

(52) U.S. Cl.
CPC .......... *G08B 21/22* (2013.01); *G06F 1/163* (2013.01); *G06F 3/017* (2013.01)

(58) Field of Classification Search
CPC .......... G08B 21/02; G08B 21/0202; G08B 21/0297; G08B 21/22; G08B 25/016; G06F 1/163; G06F 3/017

USPC .......................... 340/573.4, 539.13
See application file for complete search history.

(56) References Cited

U.S. PATENT DOCUMENTS

| | | | | |
|---|---|---|---|---|
| 5,867,103 A * | 2/1999 | Taylor, Jr. | ............ | G08B 21/00 340/573.4 |
| 7,489,249 B2 * | 2/2009 | Better et al. | ............ | G01S 19/14 340/573.4 |
| 8,115,621 B2 * | 2/2012 | Rajala et al. | ............ | G01S 1/042 340/539.13 |

\* cited by examiner

*Primary Examiner* — Thomas Mullen
(74) *Attorney, Agent, or Firm* — King & Spalding LLP (57) ABSTRACT

A portable device, for example an offender monitor, can incorporate a location detector and an orientation detector. The orientation detector, for example an accelerometer, can provide orientation information. The location detector, for example a GPS receiver, can acquire location readings that the device transmits over a cellular network. The portable device can control the location detector based on the orientation information. For example, the device can acquire more location readings when the orientation information indicates that a person wearing the portable device is reclined than when the person is upright.

16 Claims, 5 Drawing Sheets

OFFENDER MONITOR WITH ORIENTATION-BASED MONITORING

TECHNICAL FIELD

The present technology relates generally to offender monitors for tracking locations of offenders, and more particularly to utilizing device orientation to control monitoring parameters.

BACKGROUND

A variety of devices incorporate location detectors, such as global positioning system (GPS) receivers, for determining location. Many such devices have power constraints, and the location detector, when taking a location reading, consumes a substantial portion of the device's power budget. For example, for battery-operated devices, operating a GPS receiver can substantially shorten battery life, resulting in inconveniently frequent recharges or loss of service when battery energy is exhausted. The issue for wearable devices, such as offender locators, is particularly acute since the battery is typically small. Additionally, if the battery power of an offender monitor is exhausted, the offender may have an opportunity to go to an impermissible location or to otherwise perform an impermissible act that would otherwise be detected and reported by the offender monitor.

Accordingly, there are needs in the art for controlling location detection. For example, need exists for controlling location acquisition rate to manage electrical power consumption. Need further exists for identifying circumstances in which monitoring parameters can be relaxed, for example via reducing the level of monitoring. A technology addressing such a need, or some related deficiency in the art, would result in benefits that may include better portability, extended life, fewer recharges, or higher reliability, for example.

SUMMARY

A portable device can comprise a location detector, such as a GPS receiver, that provides location information about the device; an orientation detector, such as an accelerometer, that provides information about the orientation of the device; and a radio for communicating over a cellular network. An onboard battery can power the portable device. The location detector can be activated on a variable or as-needed basis. For example, to conserve battery life, the rate of acquiring location readings can be adjusted based on device orientation as determined by the orientation detector. With the device worn by a person, information from the orientation detector can indicate whether the person is reclined or upright. If the person is reclined, suggesting for example that the person is lying down in bed, the location detector can be activated less frequently than if the person is upright.

The foregoing discussion of managing utilization of a location detector is for illustrative purposes only. Various aspects of the present technology may be more clearly understood and appreciated from a review of the following text and by reference to the associated drawings and the claims that follow. Other aspects, systems, methods, features, advantages, and objects of the present technology will become apparent to one with skill in the art upon examination of the following drawings and text. It is intended that all such aspects, systems, methods, features, advantages, and objects are to be included within this description and covered by this application and by the appended claims of the application.

Many aspects of the technology can be better understood with reference to the above drawings. The elements and features shown in the drawings are not necessarily to scale, emphasis being placed upon clearly illustrating the principles of exemplary embodiments of the present technology. Moreover, certain dimensions may be exaggerated to help visually convey such principles.

DESCRIPTION OF EXAMPLE EMBODIMENTS

A computer-based system and process can improve operations of an offender monitor by controlling when or how often the offender monitor detects its location. The offender monitor can determine its orientation, and thus the orientation of the offender who is wearing the offender monitor and is under monitoring. The offender monitor can detect location less often when the offender is reclined or lying down than when the offender is upright. When the offender is in an upright position, the offender monitor can further control location detection based on the offender's step rate. When the offender is in a reclined position, the offender monitor can control location detection based on whether the offender is reclined in moving vehicle. Transfer of location data from the offender monitor to a server or other remote device can be likewise controlled.

Some example embodiments of the present technology will be discussed in further detail below with reference to the figures. However, the present technology can be embodied in many different forms and should not be construed as limited to the embodiments set forth herein. Rather, these embodiments are provided so that this disclosure will be thorough and complete, and will fully convey the scope of the technology to those having ordinary skill in the art. Furthermore, all "examples," "embodiments," "example embodiments," or "exemplary embodiments" given herein are intended to be non-limiting and among others supported by representations of the present technology.

Some of the embodiments may comprise or involve processes that will be discussed below. Certain steps in such processes may naturally need to precede others to achieve intended functionality or results. However, the technology is not limited to the order of the steps described to the extent that reordering or re-sequencing does not render the processes useless or nonsensical. Thus, it is recognized that some steps may be performed before or after other steps or in parallel with other steps without departing from the scope and spirit of this disclosure.

Figure 1:
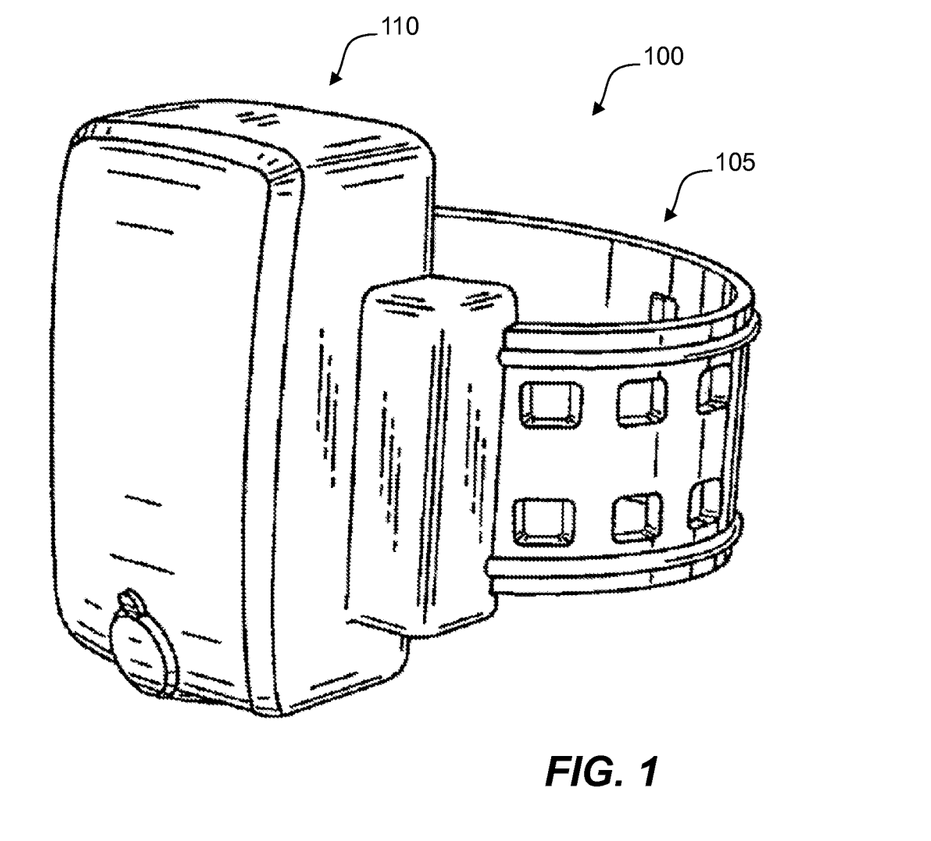
FIG. 1 is an illustration of an offender monitor in accordance with some example embodiments of the present technology.

Turning now to FIG. 1, this figure illustrates an example offender monitor 100 according to some embodiments of the present technology. The illustrated offender monitor 100 provides a representative, non-limiting example, of a tracking device.

The illustrated offender monitor 100 comprises a strap 105 that extends around an appendage of an offender who is being monitored, for example around the offender's leg. The strap 105 is attached to a housing 110 that encloses electrically powered elements as discussed below. The offender may be a criminal on parole or a person under a government order for monitoring, for example. In example embodiments, the illustrated offender monitor 100 can be characterized as a tracking device for monitoring the movement of an individual.

In some example embodiments, the housing 110 can enclose various components such as one or more batteries, electronic circuitry (e.g., a transceiver, GPS locating circuitry, antenna, etc.), optical devices (e.g., a light source, a light receiver, etc.) and optical connectors. Padding can optionally be provided on the back of the housing 110 to facilitate wearing the offender monitor 100 comfortably around a leg (or an arm) of an individual, for example. In some embodiments, such padding is omitted. The individual can be, for example, an offender who is subject to a restraining order or house arrest from a court or other authority. One end of the strap 105 attaches to the housing 110. In installation, the other end of the strap 105 can be wrapped around the individual's leg and fixed to the housing 110, for example using pins or other fasteners.

In some example embodiments, the offender monitor can be worn as two separate elements. For example, a body-worn element can provide short-range monitoring/communication, while a body-attached element can comprise a cellular radio and a GPS unit.

U.S. Pat. No. 8,115,621, issued Feb. 14, 2012 in the name of Yoganand Rajala and Steve Aninye and entitled "Device for Tracking the Movement of Individuals or Objects" discloses some example embodiments of an offender monitor 100 and is hereby incorporated herein by reference.

Figure 2:
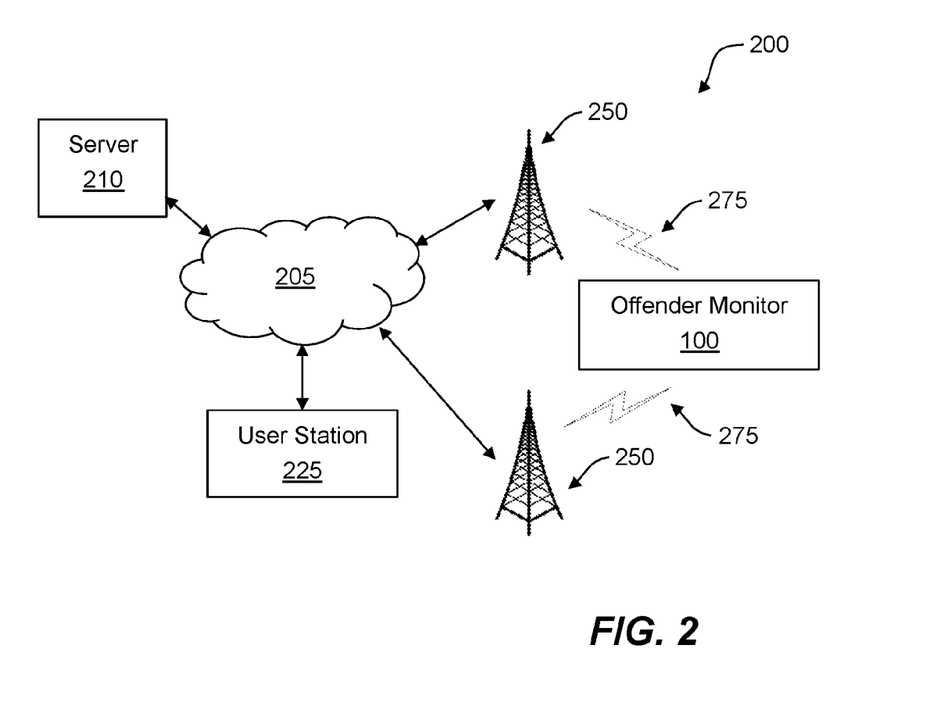
FIG. 2 is an illustration of an operating environment for an offender monitor in accordance with some example embodiments of the present technology.

Turning now to FIG. 2, this figure illustrates an example operating environment for the offender monitor 100 according to some embodiments of the present technology. In the illustrated embodiment, the operating environment comprises a cellular system 200. As illustrated, the offender monitor 100 is located near two cell towers 250 and may communicate with either via respective communication channels 275. The cell towers 250 communicate with a server 210 over a network 205. In some example embodiments, the network 205 comprises the Internet.

A user station 225 is also connected to the network 205. The user station 225 can communicate with the offender monitor 100 through the server 210, or alternatively directly. The user station 225 provides an interface through which a user, for example an officer such as a parole officer or official, can interact with the offender monitor 100 and the server 210. The officer may track offender movements and historical movement patterns through the user station 225, for example. In various embodiments, the user station 225 can comprise a smartphone or other handheld device, a laptop, a workstation, a personal computer, or other appropriate system.

The server 210 provides location services for the offender monitor 100 as well as for other monitors (not illustrated) that may be attached to other people or objects. Additionally, the server 210 typically stores configuration data that may be downloaded to the offender monitor 100, such as during startup or rebooting. In an example embodiment, the server 210 typically comprises an Internet connection, a processor, and memory. In some example embodiments, the server 210 can comprise a group or cluster of servers acting as a single logical entity.

Figure 3:
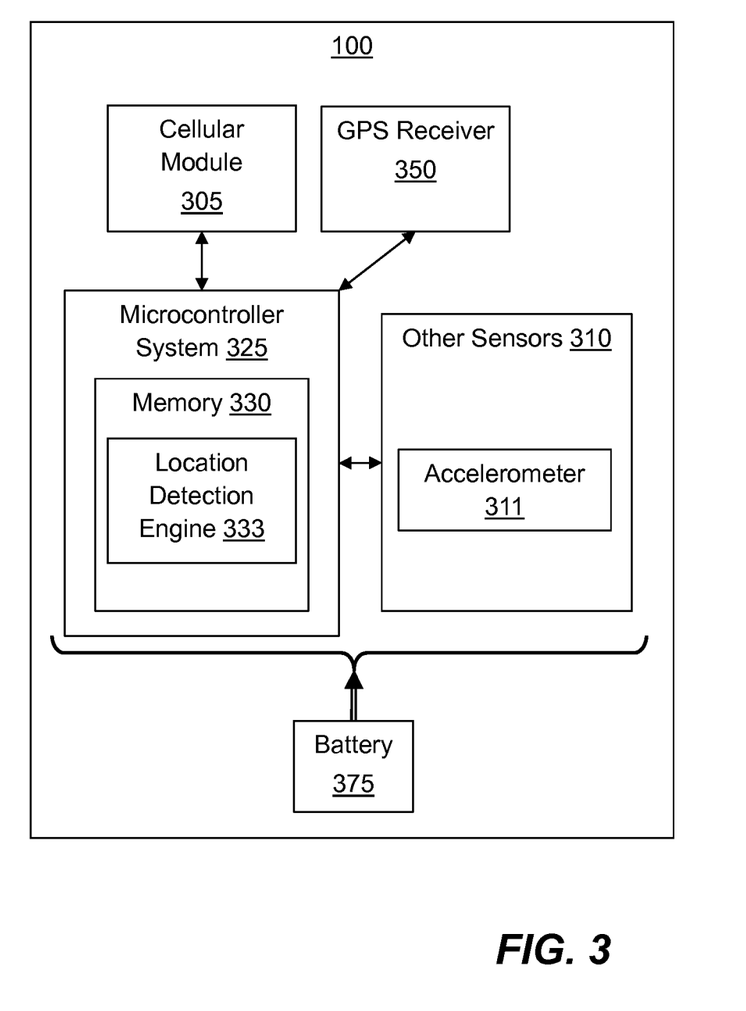
FIG. 3 is a functional block diagram of an offender monitor in accordance with some example embodiments of the present technology.

Turning now to FIG. 3, this figure illustrates a functional block diagram for the example offender monitor 100 according to some embodiments of the present technology. In the illustrated embodiment, the offender monitor 100 comprises a cellular module, a GPS receiver 350, a microcontroller system 325, and other sensors 310, all of which are powered by one or more on-board batteries 375. The cellular module 305 comprises an example embodiment of a radio. The GPS receiver 350 comprises an example embodiment of a location detector.

In the illustrated embodiment, the other sensors 310 comprise an accelerometer 311, as an example embodiment of an orientation detector. A gyroscope is another example embodiment of an orientation detector. The other sensors may further include tamper detectors, switches, microphones, etc. Example tamper detectors can include switches that open or close to provide an electrical signal when the housing 310 is opened or otherwise breached, fiber optic strands that are embedded in the strap 105 to break and stop transmitting an optical signal when the strap 105 is compromised, and other appropriate tamper sensing devices.

In operation, the cellular module 305 maintains a connection to one or more cell towers 250 over one or more wireless channels 275 through a wireless network as illustrated in FIG. 2. In an example embodiment, the cellular module 305 continuously or regularly attempts to keep a cellular connection available to the tower 250. In such an embodiment, the server 210 can control the operation of the offender monitor 100 by sending commands or other data to the monitor 100. In various embodiments, the cellular module 305 can comprise CDMA, GSM, UMTS, HSPA, or LTE technologies. In some example embodiments, the cellular module 305 and the GPS receiver 350 are integrated into a single modem module or chip or chip set.

When triggered by the microcontroller system 325, a GPS location reading occurs on the GPS receiver 350. That is, the GPS receiver 350 acquires a location reading or GPS data. The microcontroller system 235 can further control the cellular module 305 in connection with transmitting acquired location data (GPS or otherwise), notifications, alarms, and other appropriate data (to the server 210 or other recipient) and with receiving commands and other data. In some embodiments, location information is obtained utilizing cell-tower-based triangulation, such as advanced forward link trilateration (AFLT), or using a signal-strength-based location approach, such as received signal strength indicator (RSSI) based on tower or Wifi signals. The offender monitor 100 can utilize such technologies as embodiments of a location detector to augment or support, or as a substitution for, satellite-based location tracking. Further, GPS tracking can utilize assisted GPS (A-GPS) to improve location acquisition speed.

In an example embodiment, the microcontroller system 325 comprises a low-power microcontroller and associated memory 330. The microcontroller system 325 can comprise a microprocessor or other appropriate processor, for example. Example embodiments of the memory 330 can comprise volatile and nonvolatile memory, such as random access memory (RAM) and flash memory for example. In an example embodiment, the memory 330 can comprise firmware for executing management and control functions. For example, the memory 330 can comprise persistent memory that stores program code, including a location detection engine 333. An example embodiment of the location detection engine 333 comprises computer executable instructions for the utilization of the GPS receiver 350, or other location detector, based on sensory input. Accordingly, the instructions may be executed by the microcontroller system 325 or other appropriate computer-, controller-, or microprocessor-based system. For example, the location detection engine 333 can comprise code for implementing process 500 that is illustrated in flowchart form in FIG. 5 and discussed below.

Figure 4A:
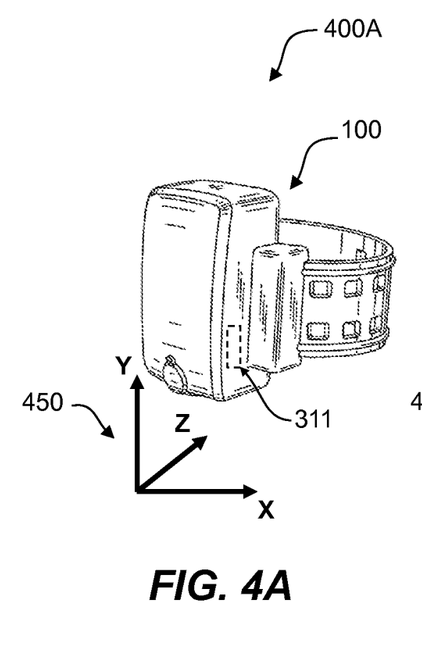
FIGS. 4A and 4B (collectively FIG. 4) are illustrations of an offender monitor in two orientations, the first indicating an upright offender and the second indicating a reclined offender in accordance with some example embodiments of the present technology.
Figure 4B:
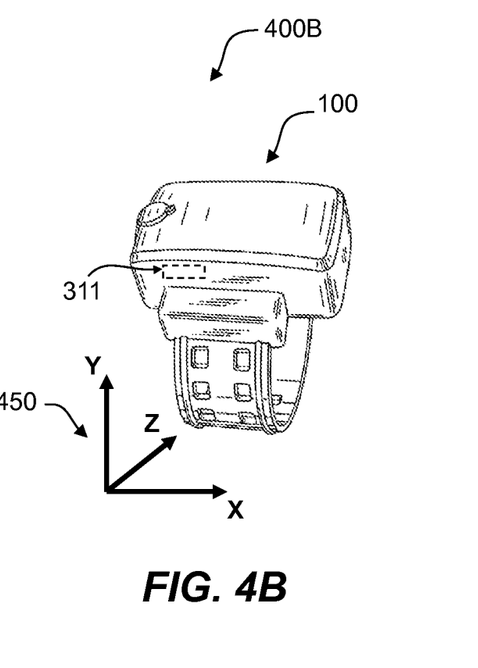

Turning now to FIG. 4, FIG. 4A illustrates the offender monitor 100 in an example orientation 400A indicating that an offender who has the monitor 100 leg-attached is upright, while FIG. 4B illustrates the offender monitor 100 in an example orientation 400B indicating that the offender is horizontal or reclined according to some embodiments of the present technology.

In operation, the accelerometer 311 of the offender monitor 100 detects applied forces, including forces applied by gravity, stopping and starting, change in direction, etc., and outputs signals conveying information about the applied forces. The signals from the accelerometer 311 thus indicate the direction of the applied forces in a coordinate system 450 and the force magnitude.

Based on the direction of the force as conveyed by the signals from the accelerometer 311, the microcontroller system 325 can determine whether the offender monitor 100 is in the orientation 400A of FIG. 4A indicating that the offender is upright. Further based on those signals, the microcontroller system 325 can determine whether the offender monitor is in the orientation 400B of FIG. 4B, indicating a horizontal or reclined offender orientation associated with lying down in a bed or on a couch. Additionally, the microcontroller system 325 can determine orientations in between the two illustrated 400A, 400B, as well as other orientations in three dimensions. Using this information, the microcontroller system 325 can apply orientation ranges. Thus, the offender may be deemed reclined if the offender leg's orientation is within a horizontal range, such as within 45 degrees or some other appropriate value of horizontal, for example. Similarly, the offender may be deemed upright if the offender leg's orientation is within a vertical range, such as within 45 degrees or some other appropriate value of vertical, for example.

The microcontroller system 325 can further process the accelerometer signals to determine offender step rate, as each step produces a characteristic force profile on the accelerometer 311. Similarly, the microcontroller system 325 can determine whether the offender is in a moving vehicle based on consistency of linear motion, stops, starts, and characteristic road vibrations.

Figure 5:
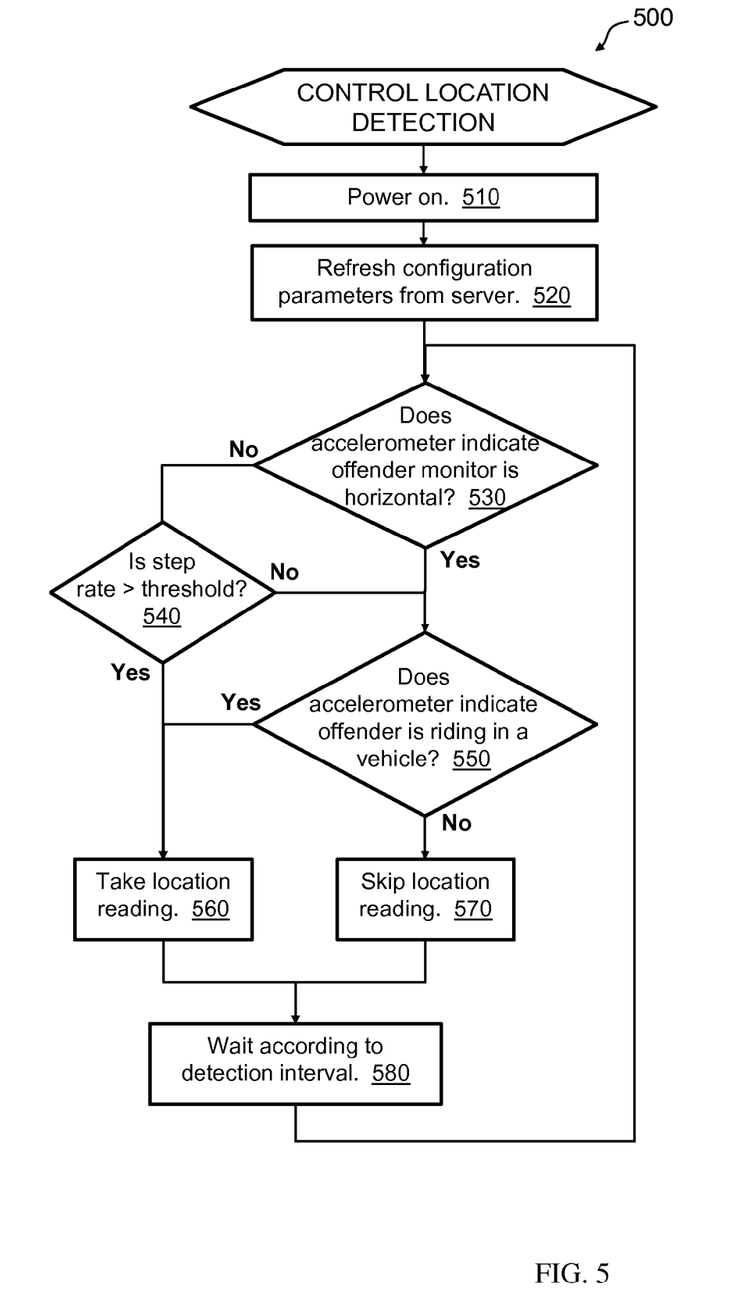
FIG. 5 is a flowchart of a process for controlling location detection in accordance with some example embodiments of the present technology.

An example embodiment of a process 500 for controlling location detection will now be described in further detail with reference to the flowchart illustrated in FIG. 5. Example reference will further be made to the preceding figures, without limitation. In some example embodiments, instructions for execution of the process 500 that FIG. 5 describes can be stored in the memory 330 and executed by the microcontroller system 325 of the offender monitor 100. As discussed above, process 500 can comprise an executable embodiment of the location detection engine 333 maintained on the memory 330.

At block 510 of process 500, the offender monitor 100 is turned on, for example during initial installation and setup or following full battery depletion/recharge or battery replacement.

At block 520 of process 500, the offender monitor 100 refreshes its configuration parameters, including monitoring parameters, alarms, and constraints. The offender monitor 100 can send a message to the server 210 requesting transmission of the parameters, or the parameters can be retrieved from the memory 330 upon power up, for example. Thus, if the network 205 is not available, the offender monitor 100 can utilize locally stored parameters, which may have been downloaded previously.

At inquiry block 530 of process 500, the accelerometer 311 (or other orientation detector) acquires orientation information and sends the resulting signals to the microcontroller system 325. The microcontroller system 325 determines and evaluates the orientation of the offender, including whether the offender is in a reclined or horizontal position.

If the offender is not reclined and is in an upright position, then at inquiry block 540, the microcontroller system 325 determines whether the signals from the accelerometer 311 indicate that the offender is walking (or running) with a step rate that is greater than a specified threshold. The threshold can be officer-selected or may be preset, for example as 50, 100, 150, or 200 steps per minute or some other appropriate value.

If the offender is deemed to be moving in excess of the specified number of steps per minute, then at block 560, the microcontroller system 325 prompts the GPS receiver 350 (or another embodiment of a location detector, which may utilize signal strength, triangulation, or another appropriate approach as discussed above) to take a location reading.

At block 580, process 500 waits a designated amount of time before looping back to block 530 to iterate and decide whether to take another location reading. That time may be 60 seconds or some other appropriate amount of time. In the case of a wait time at block 580 of 60 seconds, the offender monitor 100 has a base location-reading interval of 60 seconds and may effectively lengthen that interval (or decrease reading frequency) by skipping readings.

If execution of inquiry block 530 results in a determination that the offender is horizontal or reclined (for example lying down), then process 500 branches from block 530 to inquiry block 550, rather than to block 540 as discussed above. Process 500 also branches to inquiry block 550 from a negative determination at block 540.

At inquiry block 550, the microcontroller system 325 determines whether the signals from the accelerometer 311 indicate that the offender is riding in a vehicle. Reduction of reading frequency may be warranted if the offender is reclined in bed. However, if the offender is reclined in a moving vehicle, maintaining a relatively high reading frequency would often be appropriate. Accordingly, if the determination at inquiry block 550 is positive, then block 560 executes and a location reading is taken as discussed above. Meanwhile, if execution of block 550 results in a determination that the reclined offender is not in a vehicle, then the location reading is skipped at block 570.

In some example embodiments, the microprocessor 325 maintains a continuous step-count process based on input from the accelerometer 311. For example, the microcontroller system 325 can count offender steps between location acquisitions. That is, the microcontroller system 325 can count the number of steps the offender has taken since the last location acquisition. If that step count exceeds a threshold, then the microcontroller system 325 can initiate a location acquisition, even if the accelerometer 311 indicates the offender is reclined. And as long as the step count is below the threshold, the microcontroller system 325 can determine whether to initiate a location acquisition using logic relating to whether the offender is reclining or in a vehicle.

From skipping the location reading at block 570, process 500 waits according to the time interval at block 580 and then iterates as discussed above.

In some embodiments, the microcontroller system 325 practices the logic of process 500 for transfer of acquired location readings from the offender monitor 100 to the server 210. In such an embodiment, transmission of one or more (or a batch) of location readings can be substituted at block 560 for the action of taking a location reading. Additionally, the wait time interval of block 580 can be extended, for example by an appropriate multiple of the location-reading wait time interval discussed above.

Technology for controlling location detection has been described. From the description, it will be appreciated that embodiments of the present technology overcome limitations of the prior art. Those skilled in the art will appreciate that the present technology is not limited to any specifically discussed application or implementation and that the embodiments described herein are illustrative and not restrictive. From the description of the exemplary embodiments, equivalents of the elements shown therein will suggest themselves to those skilled in the art, and ways of constructing other embodiments of the present technology will appear to practitioners of the art.

What is claimed is:

1. An offender monitor comprising:
   a battery;
   a location detector;
   an orientation detector;
   a radio configured to provide the offender monitor with a capability for wireless communication;
   a processor that is powered by the battery and that comprises:
      a connection to the location detector;
      a connection to the orientation detector;
      a connection to the radio; and
      memory; and
   processor-executable instructions stored in the memory to perform the steps of:
      determining orientation of the offender monitor based on signals from the orientation detector;
      if the determined orientation indicates that a wearer of the offender monitor is upright, then acquiring location data at a rate; and
      if the determined orientation indicates that the wearer of the offender monitor is substantially horizontal, then acquiring location data less often than the rate.

2. The offender monitor of claim 1, wherein the orientation detector comprises an accelerometer.

3. The offender monitor of claim 1, wherein the orientation detector comprises an accelerometer, and
   wherein the step of if the determined orientation indicates that the wearer of the offender monitor is substantially horizontal, then acquiring location data less often than the rate comprises:
      if the determined orientation indicates that the wearer of the offender monitor is substantially horizontal and if the signals from the accelerometer indicate that the wearer is in a moving vehicle, then acquiring location data at the rate; and
      if the determined orientation indicates that the wearer of the offender monitor is substantially horizontal and if the signals from the accelerometer indicate that the wearer is not in the moving vehicle, then acquiring location data less often than the rate.

4. The offender monitor of claim 1, wherein the orientation detector comprises an accelerometer, and
   wherein the step of if the determined orientation indicates that the wearer of the offender monitor is upright, then acquiring location data at the rate comprises:
      if the signals from the orientation detector indicate that the wearer of the offender monitor is upright and is stepping more rapidly than a threshold, then acquiring location data at the rate; and
      if the signals from the orientation detector indicate that the wearer of the offender monitor is upright and is stepping more slowly than the threshold, then acquiring location data less often than the rate.

5. The offender monitor of claim 1, wherein the location detector comprises a GPS receiver,
   wherein the step of acquiring location data at the rate comprises acquiring GPS data at the rate using the GPS receiver,
   wherein the step of acquiring location data less often than the rate comprises acquiring GPS data less often than the rate, and
   wherein the offender monitor further comprises:
      a housing in which the battery, the GPS receiver, the radio, the orientation detector, and the processor are disposed; and
      a strap that is sized for attaching the housing to an offender.

6. The offender monitor of claim 1, wherein the step of acquiring location data at the rate consumes substantially more battery power than the step of acquiring location data less often than the rate, and
   wherein the step of if the determined orientation indicates that the wearer of the offender monitor is substantially horizontal, then acquiring location data less often than the rate comprises
      if the determined orientation indicates that the wearer of the offender monitor is substantially horizontal and if a number of steps taken by the wearer since a prior location acquisition is less than a threshold, then acquiring location data less often than the rate.

7. An offender monitor comprising:
   a battery;
   a location detector;
   an orientation detector;
   a radio that provides the offender monitor with a capability for wireless communication;
   a processor that is powered by the battery and that comprises:
      a connection to the location detector;
      a connection to the orientation detector;
      a connection to the radio; and
      memory; and
   processor-executable instructions stored in the memory to perform the steps of:
      determining whether an offender is lying down based on input from the orientation detector;
      if the offender is determined not to be lying down, then taking a location reading; and
      if the offender is determined to be lying down, then skipping the taking of the location reading,
   wherein the step of if the offender is determined not to be lying down, then taking the location reading comprises taking a first plurality of location readings during a time, and
   wherein the step of if the offender is determined to be lying down, then skipping the taking of the location reading comprises
      taking a second plurality of location readings during the time, wherein the second plurality is less than the first plurality.

8. The offender monitor of claim 7, wherein the offender monitor further comprises:
- a housing in which the battery, the location detector, the orientation detector, the radio, and the processor are disposed; and
- a strap that is sized for attaching the housing to a leg of the offender.

9. An offender monitor comprising:
- a battery;
- a location detector;
- an orientation detector;
- a radio that provides the offender monitor with a capability for wireless communication;
- a processor that is powered by the battery and that comprises:
  - a connection to the location detector;
  - a connection to the orientation detector;
  - a connection to the radio; and
  - memory; and
- processor-executable instructions stored in the memory to perform the steps of:
  - determining whether an offender is lying down based on input from the orientation detector;
  - if the offender is determined not to be lying down, then taking a location reading; and
  - if the offender is determined to be lying down, then skipping the taking of the location reading,
- wherein the orientation detector comprises an accelerometer,
- wherein the location detector comprises a GPS receiver, and
- wherein the step of if the offender is determined to be lying down, then skipping the taking of the location reading comprises
  - if the offender is determined to be lying down and to have taken fewer than a threshold number of steps since a preceding location reading, then skipping the taking of the location reading.

10. An offender monitor comprising:
- a battery;
- a location detector;
- an orientation detector;
- a radio that provides the offender monitor with a capability for wireless communication;
- a processor that is powered by the battery and that comprises:
  - a connection to the location detector;
  - a connection to the orientation detector;
  - a connection to the radio; and
  - memory; and
- processor-executable instructions stored in the memory to perform the steps of:
  - determining whether an offender is lying down based on input from the orientation detector;
  - if the offender is determined not to be lying down, then taking a location reading; and
  - if the offender is determined to be lying down, then skipping the taking of the location reading,
- wherein the location detector comprises a GPS receiver, and
- wherein the step of if the offender is determined not to be lying down, then taking the location reading comprises
  - on a time interval, cyclically taking location readings, the time interval defining an amount of time between two location readings without any location readings taken during the time interval, and
- wherein the step of if the offender is determined to be lying down, then skipping the taking of the location reading comprises
  - lengthening the time interval.

11. An offender monitor comprising:
- a battery;
- an accelerometer;
- a location detector;
- a cellular module that provides the offender monitor with wireless communication capabilities;
- a processor that is powered by the battery and that comprises:
  - a connection to the location detector;
  - a connection to the accelerometer;
  - a connection to the cellular module; and
  - memory; and
- processor-executable instructions that are stored in the memory and that are operable to cause performance of a process that comprises the steps of:
  - processing signals flowing over the connection to the accelerometer to determine whether an offender who is being monitored by the offender monitor is reclined; and
  - controlling acquisition of location readings via the location detector according to the determination,
- wherein the step of controlling acquisition of location readings via the location detector according to the determination comprises
  - if the offender is determined to be in a reclined orientation, then reducing a location reading rate relative to if the offender is determined to be in an upright orientation.

12. The offender monitor of claim 11, wherein the offender monitor further comprises:
- a housing in which the battery, the location detector, the accelerometer, the cellular module, and the processor are disposed; and
- a strap that is sized for attaching the housing to a leg of the offender.

13. The offender monitor of claim 11, wherein the location detector comprises a GPS receiver.

14. An offender monitor comprising:
- a battery;
- an accelerometer;
- a location detector;
- a cellular module that provides the offender monitor with wireless communication capabilities;
- a processor that is powered by the battery and that comprises:
  - a connection to the location detector;
  - a connection to the accelerometer;
  - a connection to the cellular module; and
  - memory; and
- processor-executable instructions that are stored in the memory and that are operable to cause performance of a process that comprises the steps of:
  - processing signals flowing over the connection to the accelerometer to determine whether an offender who is being monitored by the offender monitor is reclined; and
  - controlling acquisition of location readings via the location detector according to the determination,
- wherein the process further comprises the step of:
  - if the offender is determined to be reclined, then determining whether the offender is in a moving vehicle based on the signals, and wherein the step of controlling acquisition of location readings via the location detector according to the determination comprises:
  if the offender is determined to be reclined in the moving vehicle, then acquiring location readings more frequently than if the offender is determined to be reclined and stationary.

15. An offender monitor comprising:
a battery;
an accelerometer;
a location detector;
a cellular module that provides the offender monitor with wireless communication capabilities;
a processor that is powered by the battery and that comprises:
  a connection to the location detector;
  a connection to the accelerometer;
  a connection to the cellular module; and
  memory; and
processor-executable instructions that are stored in the memory and that are operable to cause performance of a process that comprises the steps of:
  processing signals flowing over the connection to the accelerometer to determine whether an offender who is being monitored by the offender monitor is reclined; and
  controlling acquisition of location readings via the location detector according to the determination,
wherein the process further comprises the step of
  responsive to determining that the offender is not reclined, performing the steps of:
    determining, based on the signals, whether the offender has a step rate that meets a threshold;
    if the step rate meets the threshold, then acquiring location readings at a first rate; and
    if the step rate does not meet the threshold, then acquiring location readings at a second rate that is lower than the first rate.

16. An offender monitor comprising:
a battery;
an accelerometer;
a location detector;
a cellular module that provides the offender monitor with wireless communication capabilities;
a processor that is powered by the battery and that comprises:
  a connection to the location detector;
  a connection to the accelerometer;
  a connection to the cellular module; and
  memory; and
processor-executable instructions that are stored in the memory and that are operable to cause performance of a process that comprises the steps of:
  processing signals flowing over the connection to the accelerometer to determine whether an offender who is being monitored by the offender monitor is reclined; and
  controlling acquisition of location readings via the location detector according to the determination,
wherein the location detector detects location using triangulation or signal strength, and
wherein the step of processing signals flowing over the connection to the accelerometer to determine whether the offender who is being monitored by the offender monitor is reclined comprises
  processing signals flowing over the connection to the accelerometer to determine whether the offender who is being monitored by the offender monitor is reclined and has taken fewer than a threshold number of steps since a location reading event carried out by the location detector, wherein the location reading event comprises a location acquisition performed by the location detector.

\* \* \* \* \*